United States Patent [19]

Zimin et al.

[11] Patent Number: 5,504,199
[45] Date of Patent: Apr. 2, 1996

[54] METHOD OF INTRODUCING DYES TO ETHANOL

[75] Inventors: Alejandra Zimin, Wayne; Peter A. Caputo, South Orange; Michael R. Friswell, Wayne, all of N.J.; David L. Booth, Crystal Lake, Ill.; Michael P. Hinton, Neshanic Station, N.J.

[73] Assignee: Morton International, Inc., Chicago, Ill.

[21] Appl. No.: 330,410

[22] Filed: Oct. 28, 1994

[51] Int. Cl.⁶ .......................... C09B 67/38; C09B 67/40; C09B 67/44; D06P 1/18; D06P 1/90
[52] U.S. Cl. .................. 534/887; 8/611; 534/649; 534/650; 534/651; 552/238; 44/600; 208/12
[58] Field of Search .................... 534/887, 649, 534/650, 651; 8/611; 552/238

[56] References Cited

U.S. PATENT DOCUMENTS

| | | | |
|---|---|---|---|
| 2,124,590 | 7/1938 | Reed | 534/887 X |
| 2,564,225 | 8/1951 | Mayers | 534/887 X |
| 3,330,819 | 7/1967 | Neave | 534/887 X |
| 3,862,120 | 1/1975 | Orelup | 534/887 X |
| 3,910,875 | 10/1975 | Rieper et al. | 534/887 X |
| 4,056,367 | 11/1977 | Arsac et al. | 534/649 X |
| 4,617,381 | 10/1986 | Hinson et al. | 534/576 |
| 4,737,581 | 4/1988 | Hari | 534/887 X |
| 4,886,517 | 12/1989 | Bugaut et al. | 534/887 X |

FOREIGN PATENT DOCUMENTS

| | | | |
|---|---|---|---|
| 0737876 | 10/1969 | Belgium | 534/887 |
| 0585127 | 10/1959 | Canada | 534/887 |

*Primary Examiner*—Floyd D. Higel
*Attorney, Agent, or Firm*—Wayne E. Nacker; Gerald K. White

[57] ABSTRACT

A dye which is either 2-naphthalenol (phenylazo) phenyl azo alkyl derivatives and 1,4-dialkylamino anthraquinone is added to sufficient non-ionic surfactant to compatibilize it with ethanol and an solvent to produce a homogeneous solution. The homogeneous solution is added to ethanol in an amount to provide a desired amount of coloration to the ethanol.

6 Claims, No Drawings

METHOD OF INTRODUCING DYES TO ETHANOL

The present invention is directed to a method of introducing dyes, generally insoluble in ethanol, into ethanol.

BACKGROUND OF THE INVENTION

It is known to dye petroleum fuels as a means of visual identification, e.g., for tax purposes, identity of source, to guard against mixing of grades, etc. The dyes used to color petroleum dyes are generally of the type designated "solvent dyes".

An alternative to petroleum fuel is ethanol, currently widely used in Brazil. There are advantages to using dyes currently used in petroleum fuels as dyes in ethanol. In particular, such dyes have been tested and used extensively in internal combustion engines and are known to be compatible for use in internal combustion engines.

Unfortunately, as ethanol is much more polar than petroleum fuels, certain solvent dyes commonly used in petroleum fuels have very low solubility in ethanol. In the ethanol fuel itself, very little ethanol-solubility is required as dyes of this type are typically added in the parts per million ranges, e.g. 1–100 ppm. However, for a dye to be used in practice, it must generally be available in a concentrated form to avoid the necessity of storing, shipping and handling large volumes, and must generally be available in liquid form for accurate metering into the fuel. When a dye is very insoluble in ethanol, it is difficult to supply as a concentrate to ethanol as the concentrate will tend to separate from the dye.

The present invention is directed to a method of introducing particular solvent dyes having very low ethanol-solubility into ethanol.

SUMMARY OF THE INVENTION

Dyes selected from the group consisting of 2-naphthalenol (phenylazo) phenyl azo alkyl derivatives (CAS#=TSCA accession #35371) (Solvent Red 164) and 1,4-dialkylamino anthraquinone CAS#74499-36-8 (Solvent Blue 98) are solubilized in a non-ionic surfactant and a solvent to prepare a dye solution. The dye solution is added to ethanol to provide a desired level of dye, thereby coloring the ethanol for visual identification.

DETAILED DESCRIPTION OF CERTAIN PREFERRED EMBODIMENTS

Both Solvent Red 164 and Solvent Blue 98 are solvent dyes which have been used extensively to color petroleum fuels. Neither is directly soluble in ethanol to any appreciable attempt. Furthermore, even if either is dissolved as a concentrate in an ethanol-miscible solvent, such as xylene, and such solution is introduced into ethanol, the dye solution separates from the ethanol.

It is found that if either Solvent Red 164 or Solvent Blue 98 is dissolved in a solution containing a non-ionic surfactant, the solution can be added to ethanol without precipitation of the dye. Suitable non-ionic surfactants include fatty acid esters; polyoxyethylated nonyl phenol derivatives; Rhone Poulene—CO-720 and CO630 nonylphenoxypoly (ethyleneoxy) ethanol CAS #9016-45-9; Union Carbide—Tergitol D-683 alkoxylated alkylphenol CAS #37251-69-7; Rhone Poulene—Alkamide 2106 modified coconut diethanolamide CAS #68603-42-9; Rhone Poulene—Alkamuls EL-985 polyethoxylated caster oil CAS #75-21-8; and Morton International—Sotex N long chain fatty acid esters.

Neither Solvent Red 164 nor Solvent Blue forms a homogeneous solution with a non-ionic surfactant alone. Accordingly a solvent is required as a diluent. A particularly preferred type of solvent are citrus solvents. Citrus solvents are non-toxic, environmentally safe, are compatible with ethanol, and are believed to be compatible with combustion in internal combustion engines.

The term "Citrus Solvent" is used herein inclusively to include chemicals defined as citrus peel oils, terpene, terpinene, and dipentene. The definitions of these classes in *Hawley's Condensed Chemical Dictionary, Eleventh Edition* overlap:

"Citrus Peel Oils"—Edible oils expressed from the peel or rind of grapefruit, lemon, lime, orange and tangerine; Constituents: limonene, citral, and terpenes in varying percentages.

"Terpene"—$C_{10}H_{16}$ An unsaturated hydrocarbon occurring inmost essential oils and oleoresins of plants. The terpenes are based on the isoprene unit $C_5H_8$, and may be either acyclic or cyclic with one or more benzenoid groups. There are classified as monocyclic (dipentene), dicyclic (pinene) or acyclic Myrcene, according to the molecular structure.

"Terpinene"—$C_{10}H_{16}$ A mixture of three isomeric cyclic terpenes, alpha, beta and gamma terpinene.

"Dipentene"—(cinene; limonene, inactive; dl-p-mentha-1,8-diene; cajputene); Commercial form is high in dipentene content, but also contains other terpenes and related compounds in varying amounts.

"Limonene"—a widely distributed optically active terpene, closely related to isoprene. It occurs naturally in both D- and L- forms. The racemic mixture of two isomers is known as dipentene.

Other suitable diluent solvents include, but are not limited to, methyl ethyl ketone and aromatic hydrocarbons, such as toluene and xylene.

The non-ionic surfactant is employed in an amount relative to the dye sufficient to fully render the dye compatible with ethanol. Typically, this will be at least about 35 and preferably at least about 70 parts by weight, based upon 100 parts by weight of dye. Solvent is used in an amount sufficient to form a homogeneous solution, typically at least about 50 parts by weight based upon 100 parts of dye and preferably at least about 100 parts by weight. The dyes used in the invention begin to exhibit visually observable color in ethanol in the 0.5–25 ppm (by weight) range; accordingly, the solution need not have a high concentration of dye. However, for shipping, packaging and other efficiencies, the solution typically contains at least about 1 wt % dye and preferably between about 10 and about 50 wt % dye. A typical solution for adding to ethanol typically contains between about 5 and about 25 wt %, preferably between about 10 and about 25 wt % non-ionic surfactant. A typical solution for adding to ethanol typically contains between about 25 and about 94 wt %, preferably between about 30 and about 40 wt %, solvent.

The active dye, non-ionic surfactant, and solvent are simply blended together to form a homogeneous solution. The solution is directly added to ethanol in an amount to provide the desired amount of coloration thereto. Already prepared solutions of Solvent Red 164 and Solvent Blue 98 are sold under the trademarks Aquamate™ Red 20134 L and Aquamate™ Blue 20123, respectively, for the purpose of preparing aqueous dispersions thereof.

The invention will now be described in greater detail by way of specific examples.

EXAMPLE 1

A solution of Automate® (Morton International, Inc.) Red B in (Red B in Xylene (65 wt % dye, 35 wt % xylene)) was mixed with Igepal® CO-720 (epoxylated nonyl phenol), a non-ionic surfactant and additional xylene as follows (wt percentages):

|   | Automate Red B | Epoxylated nonyl phenol | Xylene | Wt % dye |
|---|---|---|---|---|
| 1 | 85 | 15 |  | 55.3 |
| 2 | 75 | 25 |  | 48.7 |
| 3 | 50 | 24.0 | 18.6 | 32.5 |
| 4 | 50 |  | 42.6 | 32.5 |

About drop of each specimen was added to 50 ml. of ethanol in a Nessler tube; results are as follows:
1. Drop settled to bottom, dissolved after 8 hrs.
2. Drop settled to bottom, dissolved after 1 hr.
3. Dissolved readily.
4. Settled to bottom as streaks, did not dissolve.

EXAMPLE 2

Automate® Blue 8, which contains 55 wt % Solvent Blue 98, 45 wt % xylene is mixed at 33 wt % with 47.3 wt % Vortex® (a citrus solvent) and 19.7 Sotex® N (a long chain fatty acid ester surfactant sold by Morton International) (18.15% dye in mixture). A drop of straight Automate® Blue 8 and a drop of the mixture were each added as a drop to 50 ml. ethanol in a Nessler tube. The straight Automate® drop sank slowly to the bottom and stayed primarily on the bottom. The mixture totally dissolved in about 15 minutes.

What is claimed is:

1. A method of introducing a solvent dye selected from the group consisting of 2-naph-thalenol (phenylazo) phenylazoalkyl compounds and 1,4-dialkylamino anthraquinone into ethanol, the method comprising forming a homogeneous solution of said dye and in organic solvent in the presence of sufficient non-ionic surfactant to compatabilize the dye with ethanol, and adding side homegenous solution to ethanol.

2. A method according to claim 1 wherein said non-ionic surfactant in said solution is present at at least about 35 wt % relative to the weight of the dye.

3. A method according to claim 1 wherein said non-ionic surfactant in said solution is present at at least about 70 wt % relative to the weight of the dye.

4. A method according to claim 1 wherein said organic solvent in said solution is present at at least about 50 wt % relative to the weight of the dye.

5. A method according to claim 1 wherein said organic solvent in said solution is present at at least about 100 wt % relative to the weight of the dye.

6. A method according to claim 1 wherein said organic solvent comprises a citrus solvent.

* * * * *